United States Patent
Arnold et al.

(10) Patent No.: US 7,016,849 B2
(45) Date of Patent: Mar. 21, 2006

(54) METHOD AND APPARATUS FOR PROVIDING SPEECH-DRIVEN ROUTING BETWEEN SPOKEN LANGUAGE APPLICATIONS

(75) Inventors: James F. Arnold, Helena, MT (US); Horacio E. Franco, Menlo Park, CA (US); David J. Israel, Palo Alto, CA (US)

(73) Assignee: SRI International, Menlo Park, CA (US)

( * ) Notice: Subject to any disclaimer, the term of this patent is extended or adjusted under 35 U.S.C. 154(b) by 865 days.

(21) Appl. No.: 10/105,890

(22) Filed: Mar. 25, 2002

(65) Prior Publication Data

US 2003/0182131 A1     Sep. 25, 2003

(51) Int. Cl.
*G10L 15/00* (2006.01)
(52) U.S. Cl. .................................... 704/275
(58) Field of Classification Search .............. None
See application file for complete search history.

(56) References Cited

U.S. PATENT DOCUMENTS

| | | | |
|---|---|---|---|
| 4,926,491 A * | 5/1990 | Maeda et al. ............... 382/155 |
| 5,303,330 A * | 4/1994 | Gersho et al. .............. 706/16 |
| 5,425,128 A | 6/1995 | Morrison .................. 395/2.52 |
| 5,719,921 A * | 2/1998 | Vysotsky et al. ........... 704/275 |
| 5,748,974 A | 5/1998 | Johnson .................... 395/759 |
| 5,752,232 A | 5/1998 | Basore et al. .............. 704/275 |
| 5,832,063 A * | 11/1998 | Vysotsky et al. ........... 704/275 |
| 5,842,163 A | 11/1998 | Weintraub .................. 704/240 |
| 5,864,810 A | 1/1999 | Digalakis et al. ........... 704/255 |
| 6,070,139 A | 5/2000 | Miyazawa et al. .......... 704/275 |
| 6,085,160 A | 7/2000 | D'hoore et al. ............. 704/256 |
| 6,112,103 A | 8/2000 | Puthuff ...................... 455/557 |
| 6,122,613 A | 9/2000 | Baker ........................ 704/235 |
| 6,157,705 A | 12/2000 | Perrone .................... 379/88.01 |
| 6,182,038 B1 | 1/2001 | Balakrishnan et al. ...... 704/250 |
| 6,185,535 B1 | 2/2001 | Hedin et al. ................ 704/270 |

(Continued)

FOREIGN PATENT DOCUMENTS

JP     2000-172483     6/2000

(Continued)

*Primary Examiner*—David D. Knepper
(74) *Attorney, Agent, or Firm*—Kin-Wah Tong, Esq.; Patterson & Sheridan, LLP

(57) ABSTRACT

An apparatus and a concomitant method for speech recognition. In one embodiment, a distributed speech recognition system provides speech-driven control and remote service access. The distributed speech recognition system comprises a client device and a central server, where the client device is equipped with two speech recognition modules: a foreground speech recognizer and a background speech recognizer. The foreground speech recognizer is implementing a particular spoken language application (SLA) to handle a particular task, whereas the background speech recognizer is monitoring a change in the topic and/or a change in the intent of the user. Upon detection of a change in topic or intent of the user, the background speech recognizer will effect the routing to a new SLA to address the new topic or intent.

60 Claims, 3 Drawing Sheets

U.S. PATENT DOCUMENTS

| | | | |
|---|---|---|---|
| 6,188,985 B1 | 2/2001 | Thrift et al. | 704/275 |
| 6,195,641 B1 | 2/2001 | Loring et al. | 704/275 |
| 6,216,104 B1 | 4/2001 | Moshfeghi et al. | 704/260 |
| 6,223,157 B1 | 4/2001 | Fisher et al. | 704/250 |
| 6,233,561 B1 | 5/2001 | Junqua et al. | 704/277 |
| 6,233,570 B1 | 5/2001 | Horvitz et al. | 706/11 |
| 6,246,981 B1 | 6/2001 | Papineni et al. | 704/235 |
| 6,256,607 B1 | 7/2001 | Digalakis et al. | 704/222 |
| 6,260,035 B1 | 7/2001 | Horvitz et al. | 706/60 |
| 6,262,730 B1 | 7/2001 | Horvitz et al. | 345/337 |
| 6,324,513 B1 | 11/2001 | Nagai et al. | 704/275 |
| 6,421,453 B1 * | 7/2002 | Kanevsky et al. | 382/115 |

FOREIGN PATENT DOCUMENTS

| | | |
|---|---|---|
| WO | WO 99/08084 | 2/1999 |

* cited by examiner

METHOD AND APPARATUS FOR PROVIDING SPEECH-DRIVEN ROUTING BETWEEN SPOKEN LANGUAGE APPLICATIONS

The present invention relates to an apparatus and concomitant method for accessing remote information and/or services. More specifically, the present invention provides an automatic speech recognizer that monitors a change in the topic or a change in the intent of a user, thereby effecting routing between a plurality of spoken language applications or grammars.

BACKGROUND OF THE DISCLOSURE

Remote devices such as portable devices have gained wide acceptance throughout many modern societies. Portable devices include but are not limited to, cell phones, pagers, personal digital assistants (PDAs), portable global positioning devices, and networked systems within automobiles. Although such portable devices are initially designed to perform predefined tasks that are often limited to a narrow application, it is also envisioned that such devices may take on additional tasks such as accessing the World Wide Web (WWW).

However, the very nature of a portable device is its convenience which typically requires the portable device to be relatively small in physical size. Unfortunately, such requirements often constrain the processing power and the characteristics of input/output interfaces on a portable device. For example, it is generally impractical to provide a physical keyboard on a cell phone. Although an electronic keyboard can be displayed on a screen as in a PDA, such a user interface is unwieldy in performing complex tasks. Additionally, the user may be distracted while operating the portable device, e.g., while operating a vehicle.

Thus, a speech-driven user interface is desirable in a portable device. However, speech recognition systems are designed to undertake the difficult task of extracting recognized speech from an audio signal, e.g., a natural language signal. The speech recognizer within such speech recognition systems must account for diverse acoustic characteristics of speech such as vocal tract size, age, gender, dialect, and the like. Artificial recognition systems are typically implemented using powerful processors with large memory capacity to handle the various complex algorithms that must be executed to extract the recognized speech.

Unfortunately, the processing demands of speech recognition and speech processing often exceed the processing capability of current portable devices. Although the portable devices may have sufficient processing power to perform a small portion of the total functions of a full-blown speech recognition system, it is often difficult to ascertain in advance which tasks and associated data a portable device will need to perform a particular task. For example, the resources and processing cycles necessary to perform a speech-driven command to locate a particular web page on the Internet via a PDA is quite different than a speech-driven command to dial a preprogrammed phone number on a cellular phone system in an automobile.

Additionally, a user who is interfacing with an automatic speech recognition system must often operate within a rigid and idiosyncratic structure. Namely, a particular spoken language application (SLA) is often tailored to handle a particular task or topic, e.g., an SLA with a grammar tailored for handling restaurant requests, an SLA with a grammar tailored for handling flight information for an airport, and so on. In order for a user to switch topic, it is often necessary to inform the system in a distinctive and abrupt manner so that the system understands that the user wishes to switch to a new topic. For example, the user may have to utter "I would like information on restaurants now, are you ready?" or "Stop, new topic on restaurants". Such rigid rules degrade the overall user's experience with the speech recognition system.

Therefore, a need exists for a fast and computationally inexpensive method that allows speech-driven control and remote access of information and services, where a change in the topic or a change in the intent of the user is detected seamlessly without the user having to inform the system of his or her intention.

SUMMARY OF THE INVENTION

The present invention is an apparatus and a concomitant method for speech recognition. In one embodiment, the present method is a distributed speech recognition system that provides speech-driven control and remote service access.

Specifically, the distributed speech recognition system comprises at least one client device and a central server. The client device is a remote device that is in communication with the central server, but it is physically deployed apart from the central server. In operation, the client device is equipped with two speech recognition modules: a foreground speech recognizer and a background speech recognizer. The foreground and background recognizers operate in parallel. The foreground speech recognizer is implementing a particular SLA to handle a particular task, whereas the background speech recognizer is monitoring a change in the topic and/or a change in the intent of the user. Upon detection of a change in topic or intent of the user, the background speech recognizer will effect the routing to a new SLA to address the new topic.

In a second embodiment, the client device is equipped with a single speech recognition module with two SLAs operating in parallel: a foreground SLA and a background SLA. The foreground SLA is tasked to handle a particular task, whereas the background SLA is tasked to monitor a change in the topic and/or a change in the intent of the user.

The new SLA or the new grammar tailored to address the new topic can be loaded from a local storage device. However, since the present invention can be deployed in a distributed system, the new SLA or the new grammar can be transmitted remotely from the server to the client device. This distributed approach maximizes the processing power of the client device without overburdening the client device unnecessarily with a plurality of grammars from different SLAs. Additionally, the background topic or intent spotting permits seamless routing between SLAs without requiring the user to specify the need to switch to a new topic.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
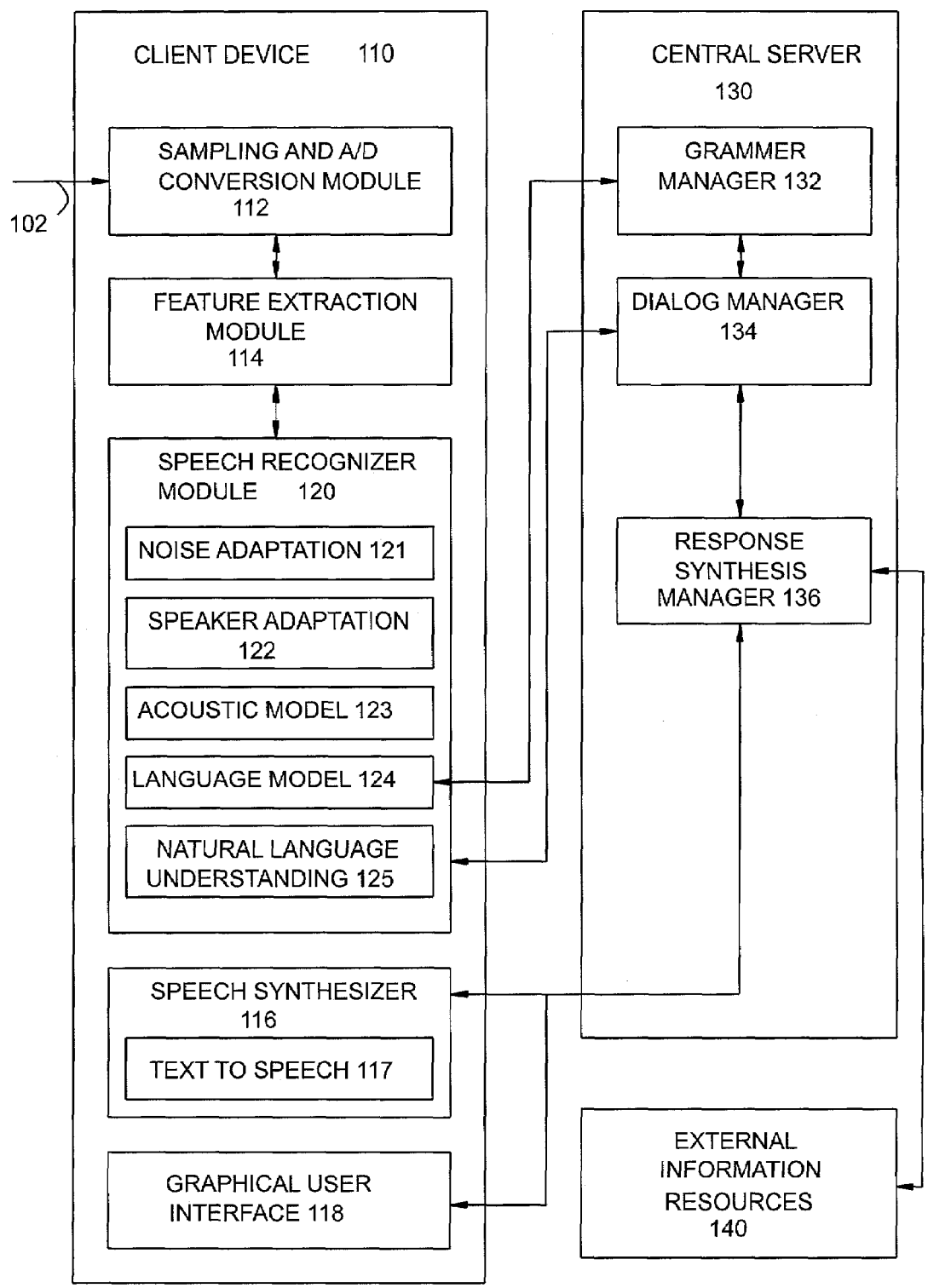
FIG. 1 illustrates a block diagram of a speech recognition system of the present invention.

FIG. 1 illustrates a block diagram of a distributed speech recognition device or system 100 of the present invention. The distributed speech recognition system 100 comprises at least one client device 110 and a central server 130. The speech recognition system 100 is designed to provide speech-driven control and remote service access via a client device. It should be noted that the distributed speech recognition device or system 100 was previously disclosed in U.S. patent application Ser. No. 10/033,772, filed Dec. 28, 2001, which is commonly assigned to the assignee of this application and is hereby incorporated in its entirety by reference.

Figure 2:
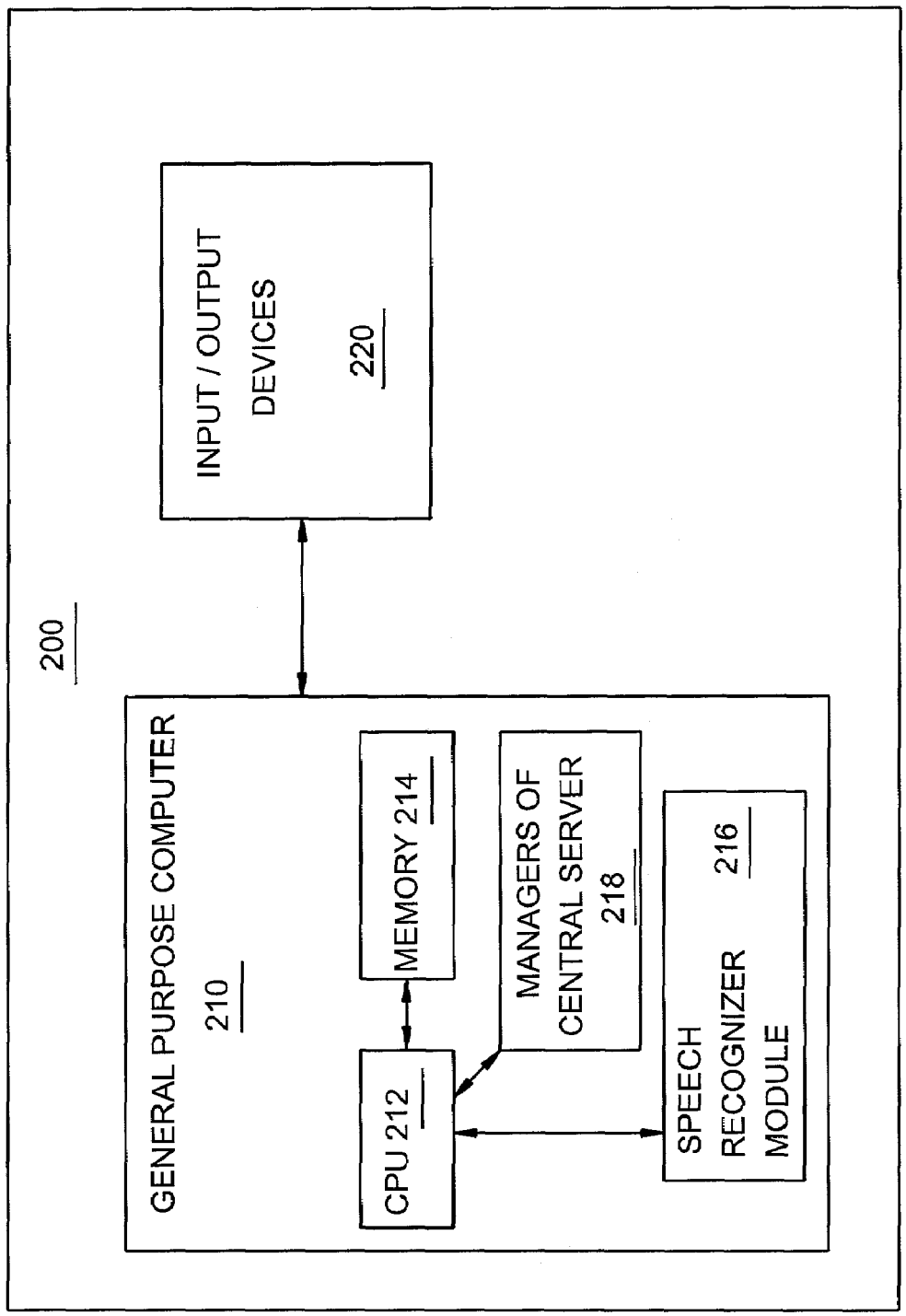
FIG. 2 illustrates a block diagram of a speech recognition system of the present invention as implemented using a general purpose computer.

In one embodiment, each of the client devices 110 and central server 130 is implemented using a general purpose computer or any other hardware equivalents as shown in FIG. 2 below. Although a "client device" 110 of the speech recognition system 100 is preferably implemented as a portable device, it should be noted that the client device can also be implemented using a larger computer system, e.g., a desktop computer or server, an office PBX and the like as required in a particular application.

Each of the client devices comprises a sampling and Analog-to-Digital (A/D) conversion module 112, a feature extractor or feature extraction module 114, a speech recognizer or a speech recognizer module 120 and various Input/Output (I/O) devices, e.g., a speech synthesizer 116, a graphical user interface 118, a microphone (not shown), an audio speaker (not shown) and the like. In operation, an input audio signal (e.g., a speech signal) on path 102 is received by the sampling and Analog-to-Digital (A/D) conversion module 112, where the input signal is sampled and digitized from a microphone into a sequence of samples that are later processed by a processor.

The digitized sequence of samples is then forwarded to the feature extraction module 114. The sample sequence is first grouped into frames (commonly 1 centi-second in length) and speech features are extracted for each of the frames using various signal processing methods. Some examples of these are Mel-cepstral features, or PLP cepstral features.

Specifically, conventional feature extraction methods for automatic speech recognition generally rely on power spectrum approaches, whereby the acoustic signals are generally regarded as a one dimensional signal with the assumption that the frequency content of the signal captures the relevant feature information. This is the case for the spectrum representation, with its Mel or Bark variations, the cepstrum, FFT-derived (Fast Fourier Transform) or LPC-derived (Linear Predictive Coding), LPC derived features, the autocorrelation, the energy content, and all the associated delta and delta-delta coefficients.

Cepstral parameters are effectively used for efficient speech and speaker recognition. Originally introduced to separate the pitch contribution from the rest of the vocal cord and vocal tract spectrum, the cepstrum has the additional advantage of approximating the Karhunen-Loeve transform of speech signal. This property is highly desirable for recognition and classification. In one embodiment of the present invention, the speech features generated by the feature extraction module 114 can be Mel-cepstral features, or PLP cepstral features.

It should be noted that the present invention is not limited to a particular type of feature, as long as the same features are used to train the models and used during the recognition process. Namely, the present invention is not feature dependent.

In turn, the speech recognizer 120 receives the speech features and is able to decode the "recognized text" from the speech features using various models as discussed below. An important aspect of the present invention pertains to the "dynamic" models that are employed by the speech recognizer 120. Specifically, due to the anticipated small footprint of the client device 110, the present invention employs "dynamic grammars" as a driving mechanism in providing the necessary models or portions or updates of a model to the client device. Since the processing capability and storage capability of the client device 110 are anticipated to be limited, the present invention is designed to provide the client device 110 with just enough data and information to perform the tasks as required by a current speaker. Thus, the client device is adapting its models in response to the speaker, hence the term "dynamic grammars".

Specifically, the central server 130 comprises a grammar manager 132, a dialog manager 134 and a response synthesis manager 136. In operation, the grammar manager 132 is in communication with the client device to provide updates to the language model on the client device as required in response to the input from the user. The dialog manager 134 is tasked with deciphering, processing and anticipating the requests of a speaker (e.g., What is the speaker requesting?, What questions must be asked of the speaker to properly understand the request?, What additional information is needed to properly execute the speaker's request?, What subsequent additional requests are expected from the speaker after the answer or service is provided to the speaker for a first request?, and so on). Finally, the response synthesis manager 136 provides the necessary responses to interact with the speaker, e.g., answers or services requested by the speaker to be displayed via an output device on the client device 110.

The operation of the speech recognition system 100 will now be described in detail. It should be noted that FIG. 1 when viewed with the discussion provided below, also serves as a flowchart for the present speaker adaptation method.

The speech recognizer 120 typically comprises a text decoder or extractor (not shown), acoustics model(s) 123 and a language model 124. Specifically, the input speech features obtained from the utterance (input audio signal) are decoded using the acoustic models 123 and a language model 124. The acoustic models are trained using a large amount of training speech. Typically, acoustic models are Hidden Markov Models (HMMs) trained for each sound unit (phone, triphone, etc.). Each HMM usually has 3 states and each state may be modeled using one or more gaussians. Some of the states may be tied by sharing the same gaussians. The HMM techniques are used to identify the most likely sequence of words that could have produced the speech signal.

However, one problem with the HMM based speech recognition is the mismatch between the speech data used for training and during testing/use. Typical training data is obtained under controlled environments that are noise free. However, the test speech is obtained in real world conditions which are usually noisy. This mismatch leads to a loss in performance. Thus, the present invention optionally incorporates a noise adaptation module 121 to compensate for the mismatch.

Numerous noise adaptation methods are available. For example, a noise adaptation method is disclosed in U.S. patent application entitled "Method And Apparatus For Recognizing Speech In A Noisy Environment", filed on Aug. 15, 2001 with a Ser. No. 09/930,389, which is commonly assigned to the assignee of this application and is hereby incorporated in its entirety by reference.

Thus, one aspect of the present speaker adaptation method is the ability to implement noise adaptation locally in response to the user's ever changing noise environment. As the speaker moves through different noise environments, the noise adaptation module 121 will account for the background noise in performing the speech recognition functions.

In one embodiment, the distributed speech recognition system may allow additional automatic "speaker adaptation" to be performed locally by a speaker adaptation module 122 of the client device 110. Namely, local parameters such as pronunciation (e.g., accents or dialect) of the speaker and/or the acoustic environment (e.g., within a tunnel or a carpeted room) around the speaker are adapted locally by the client device in performing its speech recognition functions. Speaker adaptation is particularly appropriate within the present architecture in that it is carried out in a client device largely dedicated to a particular user. Although such adaptations are performed locally, the central server may also assist the client device as necessary, e.g., forwarding a different acoustic model to the client device from the central server.

The language model 124 may incorporate a variety of knowledge sources, e.g., syntactic knowledge and semantic knowledge. Syntactic knowledge is defined as pertaining to the combination of words to form grammatically correct strings such as sentences or phrases. Semantic knowledge is defined as pertaining to the understanding of the task domain so as to be able to validate sentences or phrases that are consistent with the task being performed, or which are consistent with previously decoded sentences. Often, when only syntactic constraints are used, the language model is called a "grammar". A large vocabulary speech-recognition system, even with a simple acoustic command-and-control model, is critically dependent on linguistic information embedded in the input speech. As such, for large vocabulary speech recognition, incorporation of knowledge of the language, in the form of a "language model", is essential.

However, the very size and complexity of a comprehensive language model may overwhelm the processing capability and storage capacity of a speech recognizer 120 that is deployed in a client device 110. To address this criticality, the present speech recognition system is implemented as a distributed system. Namely, the speech recognizer 120 is initialized with a small language model that is tasked to identify a broad range of top-level user requests (e.g., for travel applications: general inquiries about restaurants, telephone numbers, travel directions, flights information for an airport, weather conditions for a particular city, traffic conditions for a particular road way and so on). Once a top-level user request is identified by the natural language understanding module 125 in cooperation with the dialog manager 134, the language model within the client device is updated by the grammar manager 132. Thus, the embedded speech recognizer 120 can be implemented as a high-accuracy, stand-alone recognizer capable of swapping language models on the fly, and capable of forwarding recognized utterances to a central facility, e.g., to the dialog manager 136 via the natural language understanding module 125.

Specifically, natural language understanding module 125 and dialog manager 134 may each incorporate semantic knowledge and pragmatic knowledge resources. Pragmatic knowledge pertains to knowledge of the task or other contextual information that is used, for example, in resolving ambiguity. Namely, natural language understanding module or the natural language grammar/parser 125 extracts meaning from a recognized utterance, and encapsulates the content in a standard Knowledge Representation (KR) format for use by the dialog manager 134.

Alternatively, it should be noted that natural language understanding module 125 could be optionally omitted in the present speech recognition distributed system if a more restrictive grammar is deployed. In other words, the present speaker adaptation and dynamic grammars methods can still be implemented without the need to provide natural language capability, if reduction in complexity is required in a particular application.

In operation, the present distributed system allows the user to carry out informational and transactional tasks by consulting with an empowered speech-capable recognition system. It allows a user to initiate and drive the conversation, with the distributed speech recognition system gently guiding the process to a quick resolution.

For example, a user may request a cab to an airport, which is a common task with more complexities than may be immediately apparent. The conversation between the user and the distributed system may be as follows:

User: I need to get to the airport.
System: SFO?
User: Oh, right. Yes. SFO.
System: When do you need to go?
User: Around 3 pm. Today.
System: Would a . . . (interrupted by the user)
User: No, I mean my flight is at 3 pm. I need a cab at one o'clock.
System: One pm. Yellow cab service can pick you up at . . . (interrupted by the user)
User: Sure.
System: I have your GPS location. This appears to be the Francis hotel?
User: Yes, front door.

To be usable in this task, the distributed speech recognition system must understand the user's original intent (to arrange for a cab), guide the user to answer the questions that make this possible, and allow the user to change his mind or correct mistakes in mid-stream, and specifically without having to restart the conversation. Thus, access to remote services, in this case a cab company, can be implemented seamlessly.

In one architectural embodiment, the language-enabled client device 110 performs the speech understanding processing, including speech-to-text transcriptions, as well as natural language processing to recognize the content and goal of what the user says via the natural language understanding module 125. The understanding process is carried out using a combination of downloadable models, that may include a task-specific grammar that characterizes the language involved in carrying out the user task. Downloadable models could also include a speech-recognition language model that, for example, statistically characterize the word sequences.

The client unit is supported by a remotely accessible dialog manager 134. The dialog manager's responsibility is to act on the user's requests. The dialog manager (DM)

provides access, on the user's behalf, to remote information and transaction resources, such as websites and special mobile services. By keeping track of the state of the dialogue, the dialog manager determines the appropriate grammar and language model updates required at the current dialogue state. In one embodiment, these updates are then carried out by a grammar manager.

Specifically, the dialogue manager has access to models of the tasks that the user is able to perform (e.g., the task parameters that must be filled in order that a specific good and/or service be ordered) and to the resources required to help the user perform them (e.g., airplane schedules, contact information for services providers, etc.). The dialogue manager updates its model of the state of the dialogue by adding the representation of the meaning of the user's current utterance, and thereby determines the progress toward satisfaction of the user's goals. In this way, the dialogue manager also determines what language model and/or grammar is required at that point in the interaction.

Using the above airport example, the client device is initially implemented with a language model that is capable of recognizing the user's request for services associated with an airport. As the dialog continues, the dialog manager 136 maintains and updates its task models and also causes the grammar manager 132 to forward relevant updates of the language model to advance the dialog to the next stage, e.g., forwarding grammar to the client device pertaining to flights and car service information for a particular airport. In this manner, the size and complexity of the various grammar and language models on the client device can be dynamically managed and changed on the fly in response to speaker adaptation.

Finally, the dialog manager accesses the remote or external information resources 140, and forwards responses to the speech synthesizer 116 and/or graphical user interface 118 to generate outputs to the user. For example, the response synthesis manager or response synthesizer 136 constructs human-understandable text (for speech synthesis) and/or graphics in a platform-dependent manner. The text can be generated locally by the central server 130 and forwarded to the speech synthesizer 116 to be "spoken" to the user via a text to speech module 117. Alternatively, the central server may actually forward the phonemes of the text to the client device, thereby further relieving the client device of expending computational cycles to convert the text into phonemes. In essence, the degree of distribution in the processing of text to speech as a spoken response to the user can be tailored to a particular implementation.

It should be noted that the functions performed by the dialog manager 134 and natural language understanding module 125 can be adapted in accordance with the capability of a particular portable device. Namely, in one embodiment, the dialog manager 134 is implemented on the central server side, but as processing power increases on the client side, functions performed by the dialog manager can be migrated to the mobile device or vice versa. Preferably, it is desirable to locate a substantial portion of the intelligence of an intelligent speech language understanding (SLU) application in the mobile device to minimize the need to communicate with the central server 130.

Additionally, caching schemes can be employed by the speech recognizer module 120 to enhance its speech recognition functions. Namely, mobile devices are often personal to a particular user. As the user makes extensive use of the mobile device, the speech recognizer 120 will be able to identify requests that are often made by the user. As the device "learns" the habits of the user, relevant portions of the grammar and language model can be stored in the cache to improve response time. In fact, the basic language model that is initialized with the mobile device can be added to and/or adjusted in accordance with the habits of a particular user.

In fact, although the present invention discloses several local parameters (e.g., environmental noise, pronunciation and the acoustic environment around the speaker) that can be locally adapted in a client device of a distributed speech recognition system, other parameters can also be adapted locally. For example, U.S. Pat. No. 5,864,810 (issued Jan. 26, 1999) discloses a method and apparatus for speech recognition adapted to an individual speaker, which is commonly assigned to the present assignee and is herein incorporated by reference. Thus, the adaptation methods as disclosed in U.S. Pat. No. 5,864,810 can be deployed locally within the client device 110 within a larger distributed speech recognition system 100.

FIG. 2 illustrates a block diagram of a speech recognition system 200 of the present invention as implemented using a general purpose computer. The speech recognition device or system 200 comprises a processor (CPU) 212, a memory 214, e.g., random access memory (RAM) and/or read only memory (ROM), a speech recognizer module 216 or, alternatively, managers of the central server 218, and various input/output devices 220, (e.g., storage devices, including but not limited to, a tape drive, a floppy drive, a hard disk drive or a compact disk drive, a receiver, a transmitter, a speaker, a display, a speech signal input device, e.g., a microphone, a keyboard, a keypad, a mouse, an A/D converter, and the like).

Namely, speech recognizer module 216 can be the speech recognizer module 120 of FIG. 1 (or 120a and 120b of FIG. 3 below) and managers of central server 218 can be the various managers 132, 134, 136 of FIG. 1. It should be understood that the speech recognizer module 216 and managers of central server 218 can be implemented as one or more physical devices that are coupled to the CPU 212 through a communication channel. Alternatively, the speech recognizer module 216 and managers of central server 218 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 214 of the computer. As such, the speech recognizer module 216 and managers of central server 218 (including associated methods and data structures) of the present invention can be stored on a computer readable medium, e.g., RAM memory, magnetic or optical drive or diskette and the like. Additionally, it should be understood that various modules and models (e.g., feature extraction module, language models, acoustic models, speech synthesis module, translation module and its sub-modules) as discussed above or known in the art can be stored and recalled into memory 214 for execution.

Figure 3:
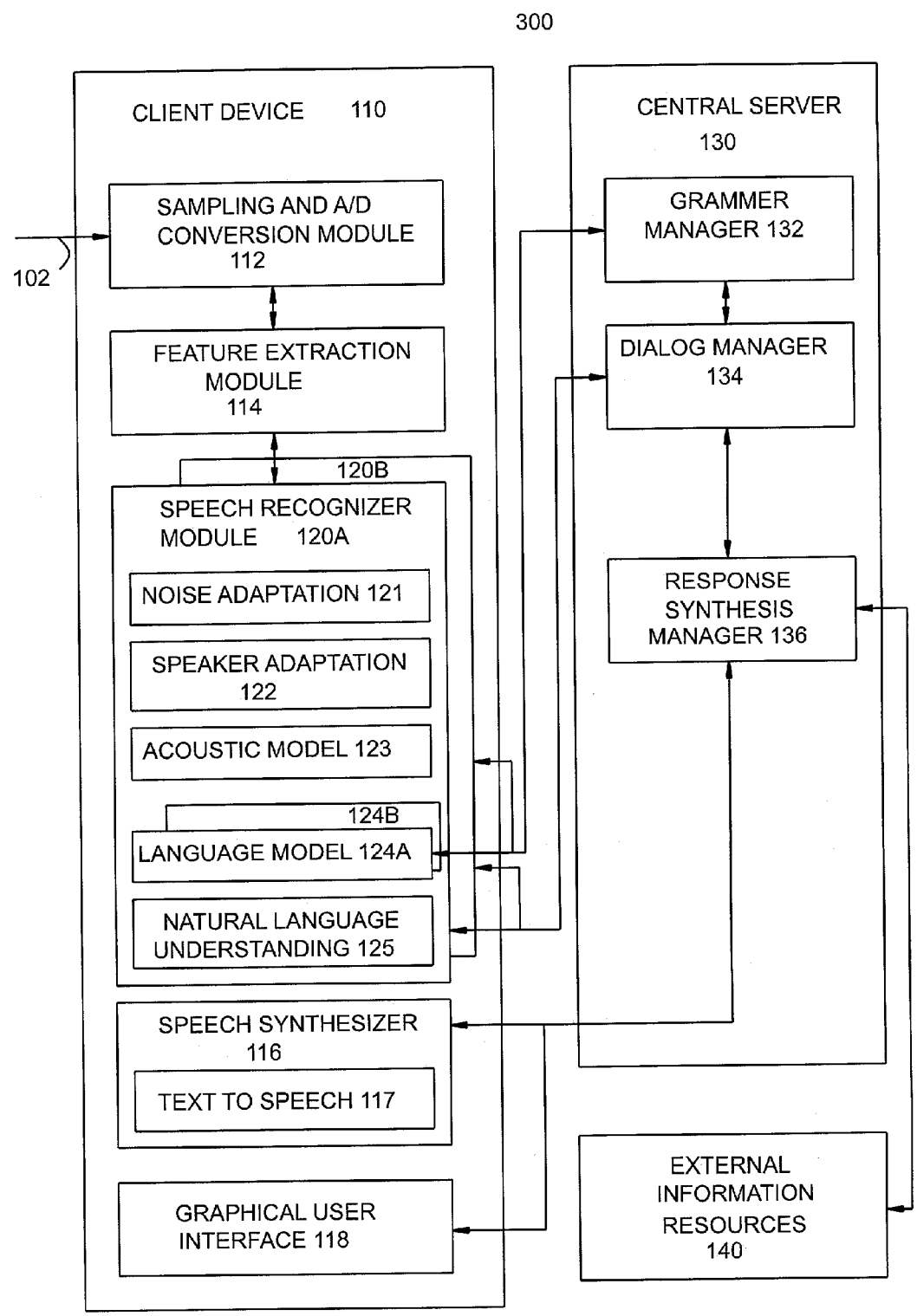
FIG. 3 illustrates a block diagram of an alternate speech recognition system of the present invention.

FIG. 3 illustrates a block diagram of an alternate speech recognition system 300 of the present invention. The speech recognition system 300 is similar to the speech recognition system 100 of FIG. 1 with the exception that it has two speech recognition modules: a foreground speech recognizer 120a and a background speech recognizer 120b. The foreground and background recognizers operate in parallel.

The foreground speech recognizer 120a is implementing a particular SLA to handle a particular task, whereas the background speech recognizer 120b is monitoring a change in the topic and/or a change in the intent of the user. Upon detection of a change in topic or intent of the user, the background speech recognizer 120b will effect the routing to a new SLA to address the new topic, e.g., informing foreground speech recognizer 120a to update or to switch to a new language model.

It should be noted that the background speech recognizer 120b may employ different modules than those of the foreground speech recognizer 120a. For example, the background speech recognizer 120b may employ only a subset of the modules of the foreground speech recognizer 120a.

In one embodiment, the background speech recognizer 120b is a statistically-based automatic speech recognizer whose function is to perform keyword or keyphrase spotting to detect changes in topic or intent of the user. Once such change is detected, the foreground speech recognizer 120a will "route" to an appropriate SLA or language model. Since the present invention allows the user to seamlessly migrate over a number of robust and flexible spoken language applications, each SLA will record the state of the interaction with the user, so that on returning to that SLA, the system can restore the state from which the user exited.

In operation, the new SLA or the new grammar tailored to address the new topic can be loaded from a local storage device. However, since the present invention can be deployed in a distributed system, the new SLA or the new grammar can be transmitted remotely from the server 130 to the client device 110. For example, once a change is detected by the background speech recognizer 120b, it will notify the Dialog manager 134. In turn, the Grammar Manager 132 is accessed to provide the necessary downloads (e.g., a new grammar) to address the detected change in topic or intent. This distributed approach maximizes the processing power of the client device 110 without overburdening the client device unnecessarily with a plurality of grammars from different SLAs. Additionally, the background topic or intent spotting permits seamless routing between SLAs without requiring the user to specify the need to switch to a new topic.

The language model (LM) of the background speech recognizer 120b is a model that is formed with the words that most usefully differentiate the individual spoken language applications with additional filler models to catch all other non-differentiating words. Thus, it emulates a word spotting system for the differentiating words. Based on the statistics of the words detected by the background speech recognizer 120b, application-recognition is continuously updated and if a change in application is detected, the language model and/or grammar for that new application is loaded in place of the current language model and/or grammar.

More specifically, the language model structure of the background speech recognizer 120b for dealing with the recognition within a given topic is defined below. First, the language model is a class-based statistical language model, which uses N-grams computed over words, classes, and a special "catch-all" word model.

The classes represent a given category or set of words that are treated as a single entity in the estimation of the language model probabilities. At recognition, each instance of a class is expanded into a sub grammar that, in its simplest embodiment includes a parallel branch to all the words in the category. For instance, if the class is such as a stock name class, then it will be expanded into a subgrammar that has all the relevant stock names as parallel branches, possibly including specific transition probabilities to each member of the class.

This approach of class can be expanded to represent more complex subgrammars such as natural numbers, dates, or addresses that are then expanded into ad hoc rule based subgrammars that represent such well-defined elements (dates, numbers, addresses, etc.).

In one embodiment, the class subgrammars can be defined and loaded dynamically, allowing for a flexible update of the component elements and/or their probabilities without having to regenerate the statistical language model again. One example of the approach of class-based language models can be found in P. F. Brown et al., "Class-Based n-gram Models of Natural Language", Computational Linguistics 18(4), 467–479, 1992.

The "catch all" word model is in charge of modeling words not explicitly defined in the vocabulary, where these words are then mapped to the "catch-all" word. The "catch-all" word is associated with an acoustic model capable of modeling general speech without discriminating among the possible words that it models. The use of the "catch all" model addresses the situation where a word is uttered that is outside of the active vocabulary. Instead of triggering a recognition error, the word utterance is matched to the "catch all" acoustic model and likely recognized as the "catch all" word. The use of the "catch all" word model allows a reduction in the size of the active vocabulary to the words that are relevant to the natural language understanding component without jeopardizing recognition accuracy of the relevant words.

The integration of appropriate classes and the "catch all" model in a statistical N-gram language models allows for a significant generalization capability of the language model even when using a small amount of training data to train such LM.

An additional advantageous effect is that a sequence of out of vocabulary words mapped to the "catch all" words can be converted to a single "catch all" instance, thereby allowing the statistical language model to capture long term dependencies when a sequence of relevant words is intermixed with a sequence of "catch all" words. For instance, a trigram can be trained that represents W1 (catch_all) W2, while the actual distance between W1 and W2 n may have several out-of-vocabulary words represented by a single "catch all" word instance.

Within this context of class-based N-grams, using a "catch-all" model will provide flexibility for the speech recognition designer to balance the resolution of the language and acoustic modeling by controlling the balance of the words explicitly modeled individually or within classes and the non-relevant words modeled by the catch-all model.

The present invention employs a good coverage of the relevant words and classes within a given domain or spoken language application to have the ability to deal with natural spontaneous speech and accomplish the task at hand. It should be noted that the "catch all" model is mostly used to represent out of domain words or non-relevant words for that task.

The grammar for topic classification and tracking of the background speech recognizer module 120b does not need high resolution (number of relevant words necessary to accomplish a given task) in any task, because its function is only to provide information to a probabilistic or natural language recognizer to discriminate among topics. To that end, the vocabulary is formed with the union of subsets of the vocabularies for each task specific language model. These subsets are defined to be representative of each task and at the same time to be maximally discriminative across the different tasks.

In one embodiment, to be within the limits of the computation power of embedded processor(s) of the client device, the total size of the vocabulary for the topic tracking grammar should be limited, e.g., not much larger than a single domain specific grammar. For that reason, the use of the "catch all" model in the language model provides the advantage of filling in the "gaps" in the input speech with a vocabulary that would have a very limited coverage for any given task. On the other hand, the grammar is intended to allow the recognizer to decode the most relevant words for any of the covered topics and provide the topic tracking recognizer 120b with useful information.

In addition to having the background speech recognizer module 120b effects the loading of an appropriate domain grammar in response to a detected change in topic, the background speech recognizer module 120b can also be deployed to detect a change in the intent of the user. A change in intent pertains to a change in the "action" that the user wishes to take. Namely, a topic change generally pertains to a change in subjects (e.g., objects or services), e.g., a user looking for information on travel books suddenly wanting to look for available vacation packages, whereas an intent change generally pertains to a change in action, e.g., a user looking for information on travel books suddenly wanting to buy, ship or borrow the books.

In detecting a change in intent, the background speech recognizer module 120b will effect the loading of an appropriate domain grammar in response to a detected change in intent, e.g., loading a new grammar or updating a current grammar to handle new "actions" desired by the user. The intent detection grammar and the topic detection grammar can be operated in parallel.

The output of the background speech recognizer module 120b can be implemented in different forms. For example, the output can be a single best output, N-best outputs, word-spotting output (word hypotheses with associated posterior probabilities), where multiple hypotheses can be represented by alternatives words at a given time.

In a second embodiment, the client device is equipped with a single speech recognition module 120a with two SLAs operating in parallel: a foreground SLA (e.g., having a language model 124a) and a background SLA (e.g., having a language model 124b). The foreground SLA is tasked to handle a particular task, whereas the background SLA is tasked to monitor a change in the topic and/or a change in the intent of the user.

In other words, this second embodiment provides spoken language application routing without the complexity of implementing two separate speech recognizer modules. In fact, those skilled in art will realize that various alternate embodiments of the present invention can be implemented ranging from two "full-blown" (i.e., all modules 121–125 are implemented) speech recognizer modules 120a and 120b to only a single module 120a having two separate language models 124a and 124b that are operating in parallel.

For example, in one embodiment, it may be appropriate to implement a second speech recognizer module 120b having only a language model 124 and a natural language understanding module 125. Alternatively, the second speech recognizer module 120b may omit all modules necessary for speech recognition but simply detects topic and/or intent changes based on the recognized speech generated by the first speech recognizer module 120a and so on.

Finally, the above disclosure indicates that a second language model or grammar is provided to the speech recognizer module 120a. The specific manner as to how the second language model or grammar is used can be tailored to a specific application. For example, the second language model or grammar can be used to replace a current language model or grammar. Alternatively, the second language model or grammar can be used to update a current language model or grammar, i.e., combining the two language models or grammars in some fashion.

Alternatively, the second language model can be used in a second pass, after a first pass that uses the first language model. In that way, the front-end computation, and most of the Gaussian computation can be cached from the first pass to the second pass, thereby allowing important savings in computation time.

In yet another embodiment, the first and the second language models can be operated in parallel as two independent active grammars. They would have independent data structures for the search for each independent language model, independent pruning mechanisms, and independent backtrace memories. All other components of the recognizer can be shared. The two independent searches perform the same Viterbi algorithm on a frame-by-frame update basis. At the end of the sentence, the optimal path is decoded from each independent backtrace memory.

Although various embodiments which incorporate the teachings of the present invention have been shown and described in detail herein, those skilled in the art can readily devise many other varied embodiments that still incorporate these teachings.

What is claimed is:

1. Method for performing speech recognition, said method comprising the steps of:
   (a) receiving a speech signal from a user;
   (b) performing speech recognition on said speech signal in accordance with a first speech recognizer to produce a recognizable text signal, wherein said speech recognizer employs a first language model;
   (c) performing speech recognition on said speech signal in parallel in accordance with a second speech recognizer for detecting a change of topic; and
   (d) forwarding a second language model to said first speech recognizer in response to said detected change of topic by said second speech recognizer.

2. The method of claim 1, wherein said speech signal is received locally from said user via a client device.

3. The method of claim 2, further comprising the step of:
   (b') adapting said performance of speech recognition by said first speech recognizer based on at least one local parameter.

4. The method of claim 2, further comprising the step of:
   (c') forwarding a signal to a central server in accordance with said detected change of topic, where said second language model is provided by said central server.

5. The method of claim 3, wherein said at least one local parameter is representative of an environmental noise.

6. The method of claim 3, wherein said at least one local parameter is representative of an acoustic environment.

7. The method of claim 3, wherein said at least one local parameter is representative of a pronunciation of said user.

8. The method of claim 1, further comprising the step of:
   (e) storing at least a portion of said second language model in a cache of said client device.

9. The method of claim 1, wherein said second speech recognizer performs said speech recognition step (c) by employing a language model that employs a catch all model.

10. The method of claim 9, wherein said catch all model is employed to model at least one word that is not defined within a vocabulary of said language model of said second speech recognizer.

11. Method for performing speech recognition, said method comprising the steps of:

(a) receiving a speech signal from a user;

(b) performing speech recognition on said speech signal in accordance with a first speech recognizer to produce a recognizable text signal, wherein said speech recognizer employs a first language model;

(c) performing topic spotting from said recognizable text signal in accordance with a second speech recognizer for detecting a change of topic; and (d) forwarding a second language model to said first speech recognizer in response to a detected change of topic by said second speech recognizer.

12. The method of claim 11, wherein said speech signal is received locally from said user via a client device.

13. The method of claim 12, further comprising the step of:

(b') adapting said performance of speech recognition by said first speech recognizer based on at least one local parameter.

14. The method of claim 12, further comprising the step of:

(c') forwarding a signal to a central server in accordance with said detected change of topic, where said second language model is provided by said central server.

15. The method of claim 13, wherein said at least one local parameter is representative of an environmental noise.

16. The method of claim 13, wherein said at least one local parameter is representative of an acoustic environment.

17. The method of claim 13, wherein said at least one local parameter is representative of a pronunciation of said user.

18. The method of claim 11, further comprising the step of:

(e) storing at least a portion of said second language model in a cache of said client device.

19. The method of claim 11, wherein said second speech recognizer performs said speech recognition step (c) by employing a language model that employs a catch all model.

20. The method of claim 19, wherein said catch all model is employed to model at least one word that is not defined within a vocabulary of said language model of said second speech recognizer.

21. Method for performing speech recognition, said method comprising the steps of:

(a) receiving a speech signal from a user;

(b) performing speech recognition on said speech signal in accordance with a first speech recognizer to produce a recognizable text signal, wherein said speech recognizer employs a first language model;

(c) performing speech recognition on said speech signal in parallel in accordance with a second speech recognizer for detecting a change of topic; and (d) updating said first language model with a second language model of said first speech recognizer in response to a detected change of topic by said second speech recognizer.

22. The method of claim 21, wherein said speech signal is received locally from said user via a client device.

23. The method of claim 22, further comprising the step of:

(b') adapting said performance of speech recognition by said first speech recognizer based on at least one local parameter.

24. The method of claim 22, further comprising the step of:

(c') forwarding a signal to a central server in accordance with said detected change of topic, where said second language model is provided by said central server.

25. The method of claim 23, wherein said at least one local parameter is representative of an environmental noise.

26. The method of claim 23, wherein said at least one local parameter is representative of an acoustic environment.

27. The method of claim 23, wherein said at least one local parameter is representative of a pronunciation of said user.

28. The method of claim 21, further comprising the step of:

(e) storing at least a portion of said second language model in a cache of said client device.

29. The method of claim 21, wherein said second speech recognizer performs said speech recognition step (c) by employing a language model that employs a catch all model.

30. The method of claim 29, wherein said catch all model is employed to model at least one word that is not defined within a vocabulary of said language model of said second speech recognizer.

31. Method for performing speech recognition, said method comprising the steps of:

(a) receiving a speech signal from a user;

(b) performing speech recognition on said speech signal in accordance with a first speech recognizer to produce a recognizable text signal, wherein said speech recognizer employs a first language model;

(c) performing speech recognition on said speech signal in parallel in accordance with a second speech recognizer for detecting a change of intent; and (d) forwarding a second language model to said first speech recognizer in response to said detected change of intent by said second speech recognizer.

32. The method of claim 31, wherein said speech signal is received locally from said user via a client device.

33. The method of claim 32, further comprising the step of:

(b') adapting said performance of speech recognition by said first speech recognizer based on at least one local parameter.

34. The method of claim 32, further comprising the step of:

(c') forwarding a signal to a central server in accordance with said detected change of intent, where said second language model is provided by said central server.

35. The method of claim 33, wherein said at least one local parameter is representative of an environmental noise.

36. The method of claim 33, wherein said at least one local parameter is representative of an acoustic environment.

37. The method of claim 33, wherein said at least one local parameter is representative of a pronunciation of said user.

38. The method of claim 31, further comprising the step of:

(e) storing at least a portion of said second language model in a cache of said client device.

39. The method of claim 31, wherein said second speech recognizer performs said speech recognition step (c) by employing a language model that employs a catch all model.

40. The method of claim 39, wherein said catch all model is employed to model at least one word that is not defined within a vocabulary of said language model of said second speech recognizer.

41. Method for performing speech recognition, said method comprising the steps of:
- (a) receiving a speech signal from a user;
- (b) performing speech recognition on said speech signal in accordance with a first spoken language application to produce a recognizable text signal, wherein said first spoken language application employs a first language model;
- (c) performing topic spotting from said recognizable text signal in accordance with a second spoken language application for detecting a change of topic; and
- (d) forwarding a second language model to said first spoken language application in response to a detected change of topic by said second spoken language application.

42. The method of claim 41, wherein said speech signal is received locally from said user via a client device.

43. The method of claim 42, further comprising the step of:
- (b') adapting said performance of speech recognition by said first spoken language application based on at least one local parameter.

44. The method of claim 42, further comprising the step of:
- (c') forwarding a signal to a central server in accordance with said detected change of topic, where said second language model is provided by said central server.

45. The method of claim 43, wherein said at least one local parameter is representative of an environmental noise.

46. The method of claim 43, wherein said at least one local parameter is representative of an acoustic environment.

47. The method of claim 43, wherein said at least one local parameter is representative of a pronunciation of said user.

48. The method of claim 41, further comprising the step of:
- (e) storing at least a portion of said second language model in a cache of said client device.

49. The method of claim 41, wherein said second spoken language application performs said topic spotting step (c) by employing a language model that employs a catch all model.

50. The method of claim 49, wherein said catch all model is employed to model at least one word that is not defined within a vocabulary of said language model of said second spoken language application.

51. A client device for performing speech recognition, said client device comprising:
- means for receiving a speech signal from a user;
- means for performing speech recognition on said speech signal in accordance with a first speech recognizer to produce a recognizable text signal, wherein said speech recognizer employs a first language model;
- means for performing a speech recognition on said speech signal in parallel in accordance with a second speech recognizer for detecting a change of topic; and
- means for forwarding a second language model to said first speech recognizer in response to said detected change of topic by said second speech recognizer.

52. A client device for performing speech recognition, said client device comprising:
- means for receiving a speech signal from a user;
- means for performing speech recognition on said speech signal in accordance with a first speech recognizer to produce a recognizable text signal, wherein said speech recognizer employs a first language model;
- means for performing topic spotting from said recognizable text signal in accordance with a second speech recognizer for detecting a change of topic; and
- means for forwarding a second language model to said first speech recognizer in response to said detected change of topic by said second speech recognizer.

53. A client device for performing speech recognition, said client device comprising:
- means for receiving a speech signal from a user;
- means for performing speech recognition on said speech signal in accordance with a first speech recognizer to produce a recognizable text signal, wherein said speech recognizer employs a first language model;
- means for performing speech recognition on said speech signal in parallel in accordance with a second speech recognizer for detecting a change of topic; and
- means for updating said first language model with a second language model of said first speech recognizer in response to a detected change of topic by said second speech recognizer.

54. A client device for performing speech recognition, said client device comprising:
- means for receiving a speech signal from a user;
- means for performing speech recognition on said speech signal in accordance with a first speech recognizer to produce a recognizable text signal, wherein said speech recognizer employs a first language model;
- means performing a speech recognition on said speech signal in parallel in accordance with a second speech recognizer for detecting a change of intent; and
- means forwarding a second language model to said first speech recognizer in response to said detected change of intent by said second speech recognizer.

55. A client device for performing speech recognition, said client device comprising:
- means for receiving a speech signal from a user;
- means for performing speech recognition on said speech signal in accordance with a first spoken language application to produce a recognizable text signal, wherein said first spoken language application employs a first language model;
- means for performing topic spotting from said recognizable text signal in accordance with a second spoken language application for detecting a change of topic; and
- means for forwarding a second language model to said first spoken language application in response to a detected change of topic by said second spoken language application.

56. A computer-readable medium having stored thereon a plurality of instructions, the plurality of instructions including instructions which, when executed by a processor, cause the processor to perform the steps comprising of:
- (a) receiving a speech signal from a user;
- (b) performing speech recognition on said speech signal in accordance with a first speech recognizer to produce a recognizable text signal, wherein said speech recognizer employs a first language model;
- (c) performing a speech recognition on said speech signal in parallel in accordance with a second speech recognizer for detecting a change of topic; and
- (d) forwarding a second language model to said first speech recognizer in response to said detected change of topic by said second speech recognizer.

57. A computer-readable medium having stored thereon a plurality of instructions, the plurality of instructions including instructions which, when executed by a processor, cause the processor to perform the steps comprising of:

(a) receiving a speech signal from a user;

(b) performing speech recognition on said speech signal in accordance with a first speech recognizer to produce a recognizable text signal, wherein said speech recognizer employs a first language model;

(c) performing topic spotting from said recognizable text signal in accordance with a second speech recognizer for detecting a change of topic; and (d) forwarding a second language model to said first speech recognizer in response to a detected change of topic by said second speech recognizer.

58. A computer-readable medium having stored thereon a plurality of instructions, the plurality of instructions including instructions which, when executed by a processor, cause the processor to perform the steps comprising of:

(a) receiving a speech signal from a user;

(b) performing speech recognition on said speech signal in accordance with a first speech recognizer to produce a recognizable text signal, wherein said speech recognizer employs a first language model;

(c) performing speech recognition on said speech signal in parallel in accordance with a second speech recognizer for detecting a change of topic; and (d) updating said first language model with a second language model of said first speech recognizer in response to a detected change of topic by said second speech recognizer.

59. A computer-readable medium having stored thereon a plurality of instructions, the plurality of instructions including instructions which, when executed by a processor, cause the processor to perform the steps comprising of:

(a) receiving a speech signal from a user;

(b) performing speech recognition on said speech signal in accordance with a first speech recognizer to produce a recognizable text signal, wherein said speech recognizer employs a first language model;

(c) performing a speech recognition on said speech signal in parallel in accordance with a second speech recognizer for detecting a change of intent; and (d) forwarding a second language model to said first speech recognizer in response to said detected change of intent by said second speech recognizer.

60. A computer-readable medium having stored thereon a plurality of instructions, the plurality of instructions including instructions which, when executed by a processor, cause the processor to perform the steps comprising of:

(a) receiving a speech signal from a user;

(b) performing speech recognition on said speech signal in accordance with a first spoken language application to produce a recognizable text signal, wherein said first spoken language application employs a first language model;

(c) performing topic spotting from said recognizable text signal in accordance with a second spoken language application for detecting a change of topic; and (d) forwarding a second language model to said first spoken language application in response to a detected change of topic by said second spoken language application.

* * * * *